United States Patent [19]

Giuffre

[11] 4,216,903
[45] Aug. 12, 1980

[54] HEAT EXCHANGE SYSTEM FOR RECYCLING STACK HEAT

[76] Inventor: Anthony A. Giuffre, 4344 N. 70th St., Milwaukee, Wis. 53216

[21] Appl. No.: 926,814

[22] Filed: Jul. 21, 1978

Related U.S. Application Data

[63] Continuation of Ser. No. 774,582, Mar. 7, 1977, abandoned.

[51] Int. Cl.³ .............................................. F24D 3/08
[52] U.S. Cl. .............................. 237/8 R; 126/299 R; 165/35; 165/105; 165/DIG. 12
[58] Field of Search ...................... 165/105, 28, 13, 35, 165/DIG. 12; 62/119; 237/67, 9 R, 8 R, 55; 126/299 R, 299 D

[56] References Cited

U.S. PATENT DOCUMENTS

| 904,499 | 11/1908 | Ammon | 237/67 X |
|---|---|---|---|
| 2,083,611 | 6/1937 | Marshall | 165/105 X |
| 2,522,373 | 9/1950 | Jodell | 237/67 X |
| 3,749,158 | 7/1973 | Szabo et al. | 165/DIG. 12 X |
| 3,827,343 | 8/1974 | Darm | 126/299 D |
| 3,980,072 | 9/1976 | Jacobs | 126/299 D |
| 4,071,080 | 1/1978 | Bridgers | 126/299 D X |
| 4,084,745 | 4/1978 | Jones | 126/299 X |

Primary Examiner—Albert W. Davis
Attorney, Agent, or Firm—McWilliams, Mann & Zummer

[57] ABSTRACT

A heat exchange system for recycling waste heat leaving a building stack to supply heat to incoming fresh air or temper stored water of the building water storage system, wherein the building has a source of heat at constant temperature, such as a cooking facility, from which air conveying waste heat is drawn and impelled through a stack in which a closed circuit heat generated refrigerant flow type refrigeration system is established including a heat recovery coil in the stack, heat discharge coils in heat transfer relation to the incoming fresh air and the stored water, liquid refrigerant traps that permit free flow therethrough of the refrigerant adjacent the heat discharge coils adjacent their discharge ends, and thermostatically controlled valves for alternately disconnecting the heat discharge coils from the heat recovery coil in accordance with a predetermined ambient air temperature exteriorally of the building.

4 Claims, 5 Drawing Figures

HEAT EXCHANGE SYSTEM FOR RECYCLING STACK HEAT

This application is a continuation of my application Ser. No. 774,582, filed Mar. 7, 1977, now abandoned.

This invention relates to providing for recycling some of the waste heat passing out of a building stack to heat incoming air or temper stored water of the building water system, and more particularly, to a refrigeration arrangement of the heat generated refrigerant flow type which achieves that end.

Buildings housing restaurant facilities and the like customarily are equipped to provide for forced air ventiliation of the cooking facilities through a stack or other suitable discharge duct, with fresh air being drawn into the building through suitable ducting for ventiliating and air replacement purposes. In many instances, and especially in the short order field, the cooking facilities, such as griddles and the like, are in intensive use for long periods of time each working day. As is common knowledge, the discharge from the stack contains much waste heat which is therefore lost to the atmosphere. On the other hand, incoming fresh air, when outside ambient temperatures are well below room temperature, requires heating; the supplying of the requisite heat for the income air is one of the greatest items of expense in the operation of such facilities.

Facilities of this type ordinarily include a hot water system supplied with water from municipal mains or other suitable source, which, of course, must be heated to provide the desired hot water. The requisite heat is usually supplied using natural gas fuel or electrical energy type heating systems (both involving considerable attendant expense in view of today's high energy expense levels).

A principal object of the present invention is to provide for a simple but effective means and method for recycling some of the waste stack heat and utilizing same to either heat the incoming fresh air, where outside ambient temperatures require this, or alternately temper stored water of the facility hot water system.

Another principal object of the invention is to provide a closed circuit heat generated refrigerant flow refrigeration system of the heat pump type of recycling stack heat, for purposes of heating incoming fresh air or tempering the stored water of the facility, in which the system is free of pumps or compressors and is arranged to provide for rapid recycling of the refrigerant through the system for maximized efficiency.

Another object of the invention is to provide for continuous recycling of the stack heat with thermostatically operated controls providing for supply of the recycled heat to the incoming fresh air when the outside ambient temperatures are below a predetermined level, and alternatively supplying recycled heat to a water tempering tank when the outside ambient temperature is above said predetermined level.

Other objects are to provide a stack heat recycling system that is of few and simple parts, economical to install and operate, and long lived in use.

In accordance with the invention, in facilities of the type indicated, a closed circuit heat generated refrigerant flow type refrigeration system is established in operative association with the building stack, the building fresh air intake duct, and the building hot water system water storage tank whereby a heat recovery coil is mounted in the stack and in heat exchange relation with the waste heat bearing gases passing through the stack, and heat transfer coils are mounted in heat transfer relation to the incoming fresh air and the storage tank water. The coils are incorporated in a closed circuit heat generated refrigerant flow system that includes a receiver or refrigerant collection tank that accommodates expansion and contraction of the refrigerant, and also serves as a vacuum chamber due to pressure differentials that build up in the flow system during its operation.

A special aspect of the invention is that the conduiting that communicates the refrigerant from the heat transfer coils for return to the heat recovery coil is formed, at the level of the receiver and heat recovery coil, with a liquid refrigerant trap of the gravity induced type which, however, is free of any obstructions to free flow of the liquid refrigerant through the conduiting involved.

Operatively associated with the heat recycling system are thermostatically operated control valves that are arranged for alternative isolation of the respective heat transfer coils from the heat recovery coil, in accordance with a predetermined ambient air temperature exteriorally of the building, whereby the heat recovered from the stack is supplied to the incoming fresh air when the exterior ambient temperature is below the selected level, and when the exterior ambient temperature is above the selected level, the recovered stack heat is applied to water to be tempered.

Alternately, the heat transfer system employed may be simplified to have the stack heat that is recovered supplied only to the incoming fresh air, or only to water to be tempered.

In any event, the heat transferred to the heat recovery coil, which preferably operates in exposure to temperatures in the 300 to 600 degree Fahrenheit range or higher, induces the cycling of the refrigerant in the system thereabout to go through the vaporization and liquification phases in refrigeration cycle manner that brings about the heat pump type heat transfer action involved between the heat recovery coil and the respective heat transfer coils. The traps that are in the return conduiting of the respective heat transfer coils resist reverse flow of the refrigerant so that there is a smooth and continuous run-around type movement of the refrigerant through the conduiting coils involved in the refrigeration system.

It is an important feature of the invention that, as temperature differentials between the heat source in the stack (which is preferably constant for any given application) and the heat discharge points of the system are increased, recycling of the refrigerant through the refrigeration system accelerates without the need for any mechanical pumping action on the refrigerant being required. This accelerating effect reaches a maximum that will depend on the refrigerant employed in the system, the heat input at the heat recovery coil, and the heat outflow from the system at the heat transfer coils employed.

Other objects, uses, and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the Patent Laws, and that the invention is susceptible of other embodiments which will be obvious to those skilled in the art, and which are intended to be covered by the appended claims.

Figure 1:
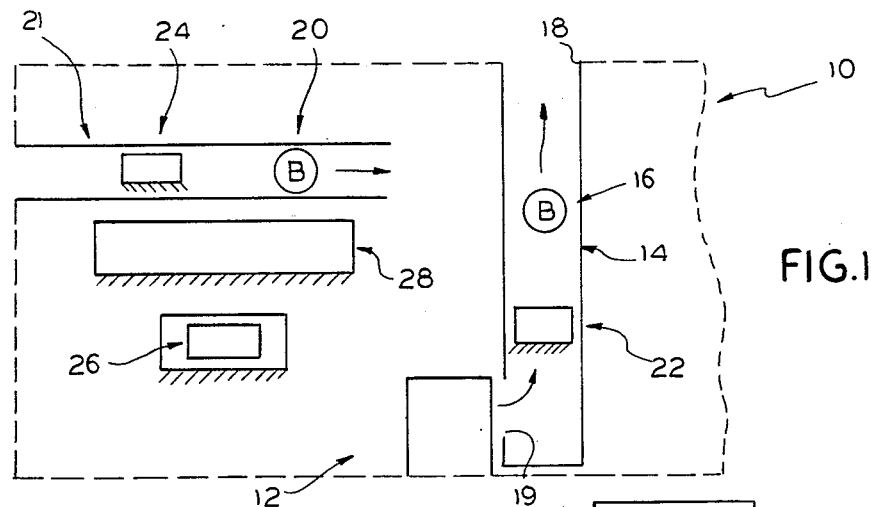
FIG. 1 is a diagrammatic view schematically showing in rough fragmental vertical section the general layout of a portion of the building of facilities of the type indicated, including a cooking facility and exhaust stack therefor, a fresh air intake duct, and a storage tank for water to be supplied to the building facility hot water system.

Reference numeral 10 of FIG. 1 generally indicates a building housing a cooking facility generally indicated by reference numeral 12 and shown in block diagram form, which is intended to represent a griddle or other type of open cooking that in use is intended to be in continuous operation for a long period of time during the work day. Typically, the building 10 is equipped with a stack 14 provided with suitable blower means 16 for impelling air outwardly of the stack 14 and through stack discharge opening 18 suitably formed in the roof of the building 10, whereby air ambient to the cooking facility 12 is drawn into the stack 14 through suitable stack intake opening 19 and discharged to the atmosphere through opening 18.

The building 10 is also typically equipped with a fresh air intake duct 21 having suitable blower 23 mounted therein for impelling fresh incoming air into the building for the usual ventilating purposes.

Figure 2:
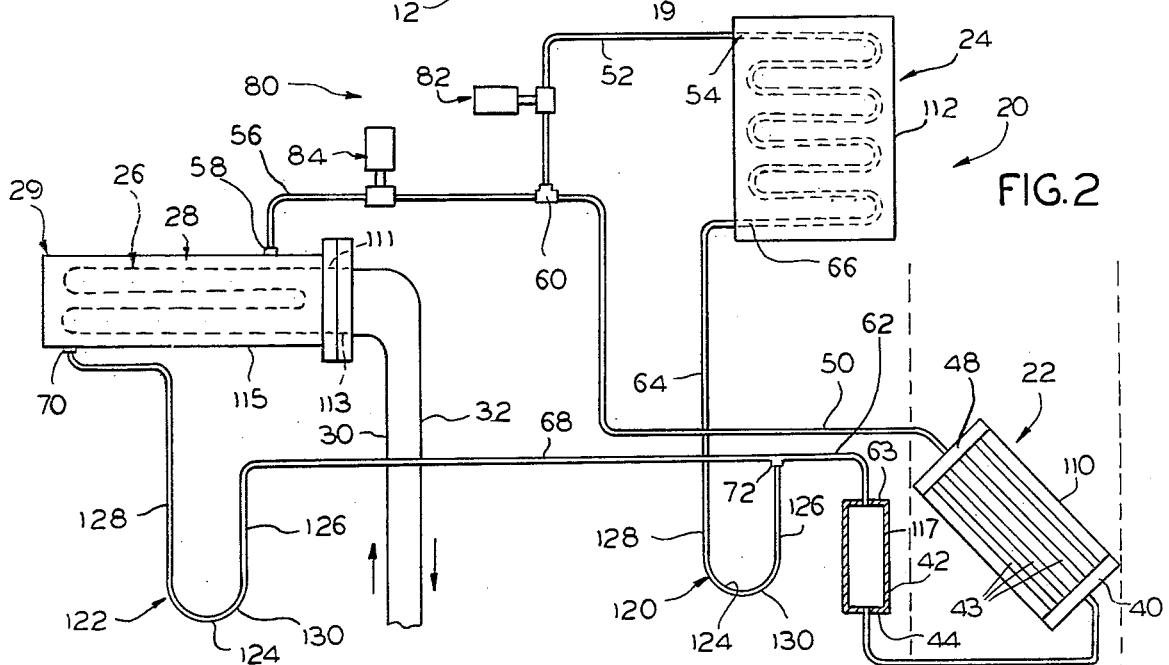
FIG. 2 is a diagrammatic view illustrating the general arrangement of the heat recycling system that is made applicable to the building arrangement illustrated in FIG. 1, in accordance with the present invention.

In accordance with the invention, the building 10 is equipped with the closed circuit heat generated refrigerant flow type heat exchange system 20 shown in FIG. 2, which comprises heat recovery or absorption coil 22 suitably mounted in stack 14 and cooperatively related by incorporation in the system 20 to heat transfer coil 24 suitably mounted in air intake duct 21 in heat discharge relation thereto and heat transfer coil 26 which is suitably mounted in heat discharge relation to the water of water holding tank 28 (which is assumed to be the building water storage tank) suitably supported in the building 10. The water of tank 28, in accordance with the invention, for water tempering or preheating purposes is connected to refrigerant receiving water tempering chamber 29 in which coil 26 is mounted by suitable inflow and outflow conduits 30 and 32 that are series connected to coil 26 for conducting the water flow therethrough.

In the diagrammatic showing of FIG. 1 the conduiting of the heat exchange system is not shown to simplify the drawing, with FIG. 2 being provided to show the essentials of the system layout involved.

The coils 22, 24 and 26 may be of any type suitable for refrigeration or heat pump heat exchange purposes. They thus may take the familiar form indicated for coils 24 and sinuous 26 and thus comprise lengths of copper tubing and in the rounded shaping indicated, that is usually associated with heat exchange coils. Coil 22 is shown in another familiar form comprising intake end manifold 40 and discharge or outflow end manifold 48 connected by spaced grid pipes 43 formed from copper or the like.

The intake or inflow end 40 of coil 22 is connected to refrigerant receiver 42, at the lower end 44 of same, by supply conduit 46 while the outflow or discharge end 48 of the coil 22 is connected to outflow refrigerant conduiting 50 for fluid flow communication with the respective coils 24 and 26 in the alternate manner contemplated by this embodiment of the invention.

Thus, conduit 50 includes branch 52 which is connected to the intake end 54 of the coil 24, and branch 56 that is connected to the chamber 29 at its refrigerant inlet 58. The branches 52 and 56 are coupled together by suitable joint 60.

Refrigerant return conduit 62 connects the upper end 63 of receiver 42 to the coil 24 and chamber 29, the conduit 62 having branch 64 connected to the discharge end 66 of coil 24, and branch 68 connected to the refrigerant discharge or outlet 70 of the chamber 29. The branches 64 and 68 are suitably connected together by joint 72.

In accordance with the embodiment of FIG. 2, it is intended that the heat recovered at coil 22, from the waste heat leaving stack 14, be released or absorbed at either coil 24 or coil 26, depending on temperature conditions of the ambient air external to the building 10. For this arrangement, the thermostatically operated control arrangement 80 of FIG. 3 (or its equivalent) is employed, which is largely block diagram illustrated, and for purposes of illustration is shown to comprise a solenoid operated off-on valve 82 incorporated in conduit branch 52 and a similar solenoid operated off-on valve 84 incorporated in conduit branch 56, with the valves 82 and 84 being electrically operated from thermostatically operated control box 86 electrically arranged so that when the temperature of the ambient air externally of the building 10 is above a predetermined level, such as 60 degrees Fahrenheit, the valve 82 closes the heat discharge coil 24 off from communication from the heat recovery coil 22, while valve 84 maintains the chamber 29 (in which is mounted heat discharge coil 26) in open communication with the heat recovery coil 22. When the temperature of the ambient air externally of the building 10 is below such selected level, the positions of valves 82 and 84 are reversed by the operation of box 86.

The control box 86 may be of any suitable type that includes suitable means for sensing or being responsive to the temperature of the ambient air externally of the building 10, and that includes suitable means for alternatively connecting the valves 82 and 84 to the suitable source of electrical energy that is to be made available for this purpose through connection thereto by suitable lead lines 90 and 92.

Figure 3:
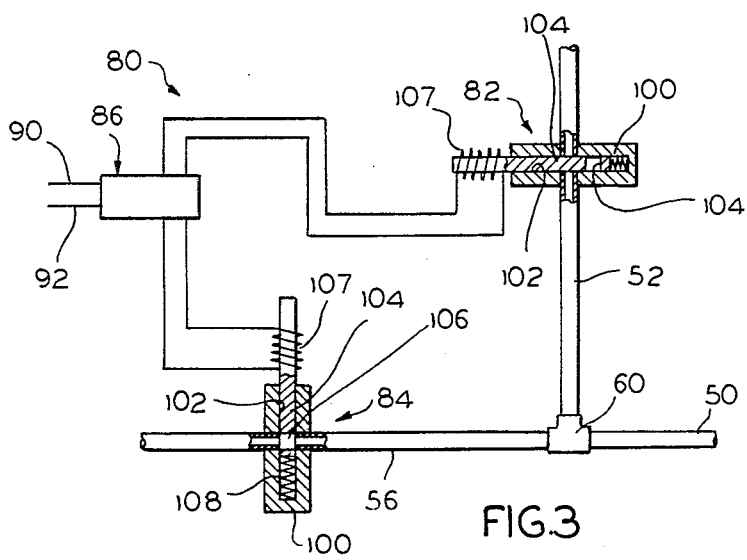
FIG. 3 is a fragmental view that is largely diagrammatic in nature illustrating a thermostatically operated control arrangement for the system of FIG. 2; and, FIGS. 4 and 5 illustrate alternate simplified embodiments of the invention.

FIG. 3 shows the condition where the ambient temperature externally of the building is above the predetermined temperature level whereby the control device arrangement 80 connects the chamber 29 to heat recovery coil 22 to expose the refrigerant flow to coil 26 for purposes of tempering the water of tank 28. When the ambient temperature level referred to drops below the predetermined level, the positions of the valves 82 and 84 reverse to disconnect the chamber 29 from coil 22 and connect the coil 24 to the coil 22 for refrigerant fluid flow thereto for application of the recovered heat to the fresh air being taken into the building through conduit 18.

The valves 82 and 84 each comprise, in the simplified form shown, a suitable valve body 100 defining valve chamber or bore 102 and reciprocably receives valve stem 104 formed with aperture 106 that is to be disposed in the position of valve 84 to permit communication between the upstream and downstream portions of the conduit branch 56, and that is to be disposed in the position of the valve 82 to block communication between the upstream and downstream segments of the branch 52. For this purpose, the valve stems 104 are shown operably associated with suitable solenoid coils 107 and arranged in the manner indicated for energization of the coils 107 to move them to the flow blocking positions indicated against the action of biasing springs 108 that, when the coils 107 are deenergized, bias the respective spindles 104 such that their apertures 106 are aligned with the respective conduit branches 52 and 56 for permitting fluid flow therethrough.

In practice the control device 80 and its valves 82 and 84 may take the form of any conventional equipment that will provide the functions indicated.

The coil 22 is incorporated in suitable frame 110 which is suitably mounted in stack 14 in the path of the fluid flow through the stack 14.

The coil 24 is suitably incorporated in a suitable frame, for supporting purposes, that is shown in block diagram form only at 112. The coil 26 is suitably mounted within chamber 29 in a convenient manner for intimate heat transfer relation with the water supplied from the tank 28 through conduits 30 and 32 that are connected to the intake and discharge ends 111 and 113 of coil 26. In the form of FIG. 2, the refrigerant flow relative to coil 26 is through chamber 29 in heat transfer relation to coil 26 through which water from tank 28 flows for water tempering purposes.

Chamber 29 may be in the form of any suitable refrigerant confining container or vessel 115 suitably mounted in building 10 and having coil 26 suitably supported in same for connection with conduits 30 and 32. Container 115 is thus hollow for refrigerant fluid flow therethrough between inlet 58 and outlet 70 whereby coil 26 is thus immersed in fluid refrigerant that bears recovered heat for transmittal through the tubing walls defining coil 26 to the water flowing therethrough.

Receiver 42 comprises a suitable fluid tight vessel 117 and mounted in any suitable manner at the level of recovery coil 22.

The refrigerant circulation system represented by the coils 22, 24, and chamber 29 and its coil 26, the receiver 42, and the conduiting interconnecting the coils and the receiver 42 is filled with a refrigerant that is matched in operating characteristics to the temperature and air flow volume within the stack 14. The specific refrigerant applied will depend upon the application, with non-toxic and non-flammable refrigerants such as halogenated hydrocarbon products sold under the trademarks Freon 11, 12, 21, 22, 113 and 114 (or combinations of same) being suitable, depending on the application. As indicated in the drawings, the system 20 is of a closed, non-mechanical pump, refrigeration type in which the flow of the refrigerant through the system is generated by the application of heat to coil 22. Of course, the conduiting, coils and chambers through which the refrigerant flows should be fluid tight throughout system 20.

Further in accordance with the invention, the system conduits connecting the liquid refrigerant return (or heat depleted side of the system) to the receiver 42 are each formed to define a liquid refrigerant trap. The trap for heat discharge coil 24 is indicated by reference numeral 120 while the trap for the return from chamber 29 is indicated by reference numeral 122.

The traps 120 and 122 each comprise a bight portion 124 formed in the conduiting involved that is vertically disposed and includes upstanding leg portions 126 and 128 connected by a upwardly directed connecting portion 130. The conduiting portions forming the traps 120 and 122 are fully opened throughout the lengths of same to provide for free flow of liquid refrigerant therethrough through the respective coils 24 and 26 under the head that exists on the liquid refrigerant within the respective traps 120 and 122. However, the quantity of liquid refrigerant that is retained by the action of gravity within the respective traps resists reverse flow tendencies that may occur in the system 20 during operation thereof and insures that the refrigerant flow rates and efficiency desired for a particular installation are obtained.

Further in accordance with the invention, the traps employed in the system 20, represented in the illustrated embodiment by traps 120 and 122, are disposed at the horizontal level of heat recovery coil 22, and between the uppermost and lowermost horizontal levels of its ends 40 and 48. Also, receiver 42 is similarly positioned, and it is a further criteria of the invention that the upper end 63 of the receiver 42 and the portions of return conduiting 62 that are downstream of the traps 120 and 122 be below the uppermost horizontal level of coil 22.

In operation, assuming that the ambient temperature externally of the building 10 is below the selected level, on start up of the system, by instituting heat flow out of stack 14 the heat discharge coil 24 is connected to the heat recovery coil 22 while the chamber 29 is disconnected therefrom by operation of control device 80 (thus isolating coil 26 from coil 22). Liquid refrigerant in coil 22 evaporates as heat is absorbed from the stack 14, with the gaseous refrigerant passing through conduit 50 and its branch 52 to and through heat discharge coil 24 wherein the refrigerant condenses to give up its heat that is transferred to the incoming air of duct 18. The reliquified refrigerant passes through trap 120 and returns to receiver 42 through the conduit 62 and its branch 64 for return to the intake end 40 of coil 22 through conduit 46. For normal operation, the heat source for system 20, represented by stack 14 in the illustrated embodiment, should be substantially constant for uniform operation of the heat pump type refrigeration system involved. The temperature in the locale of the heat recovery coil 22 within the stack 14 is preferably in the range of from approximately 300 degrees F. to approximately 600 degrees F. It will be found in practice that the refrigerant cycles through the coils 22 and 24 and receiver 42 in a run-around type relation, with the recycling accelerating in proportion to the differences in temperature at the locales of the coils 22 and 24; this acceleration effect reaches a maximum that will depend on the refrigerant employed in the system, the heat input to the system at recovery coil 22, and the heat outflow from the system at the coil 24.

More specifically, on start up of the system, liquid refrigerant in the coil evaporates as heat is absorbed by it and passes to coil 24, where it condenses to give up stored heat and returns through trap 120 to receiver 42. During the cycling involved, a pressure differential builds up between the discharge end 66 of coil 24 and the lower or discharge end of receiver 42; this pressure differential and the refrigerant cycling involved will increase, as the temperature at the locale of coil 22 rises relative to the temperature at the locale of coil 24, until a balance point, or maximum pressure difference level is reached, to provide the optimum or maximum speed of refrigeration cycling within system 20 for a given installation. As indicated this balance point will depend on the specific refrigerant employed, the amount of heat input to the system 20 (as at coil 22), and the amount of heat output provided by the system (as at coil 24); such balance point is thus generally dependent on the temperature differences at the locales of the coils 22 and 24, as well as the specific refrigerant employed.

Consequently, for any given installation, the heat source represented by the stack 14 should provide a temperature level in the locale of coil 22, relative to the temperature levels to be expected at the locale of coil 24, such that the maximum refrigerant cycling effect contemplated by this invention will be achieved. When this is observed, up to eighty percent of the input heat at coil 22, in terms of BTU's per unit of time, can be recovered from waste stack heat, depending on the heat draw off available to the system.

As indicated, when the ambient air temperature external to the building 10 rises to exceed the indicated predetermined level, the positioning of the valves 82 and 84 is reversed to disconnect the coil 24 from coil 22 and connect the chamber 29 thereto. The system 20 then operates in the same manner to supply heat to the water from tank 28 passing through coil 26, so long as the temperature of the ambient air externally of the building 10 remains at a level above the indicated predetermined level.

Practice of the invention indicates that as cycling of the refrigerant through the system 20 accelerates under the conditions indicated, a reduced pressure condition is created in receiver 42, apparently due to a separation of the refrigerant on the lower portion of the receiver from that entering same at its upper end, due to a rapid draw off of the refrigerant from the receiver as the heat input to recovery coil heat charges the refrigerant for rapid fluid flow to the heat outflow position of the system, where fluid flow of the refrigerant is retarded by friction and other resistance to fluid flow. In any event, this tendency toward reduced pressure or vacuum conditions in receiver 42 reaches a maximum coincident with the obtaining of the aforedescribed maximum cycling speed of the refrigerant.

Figure 4:
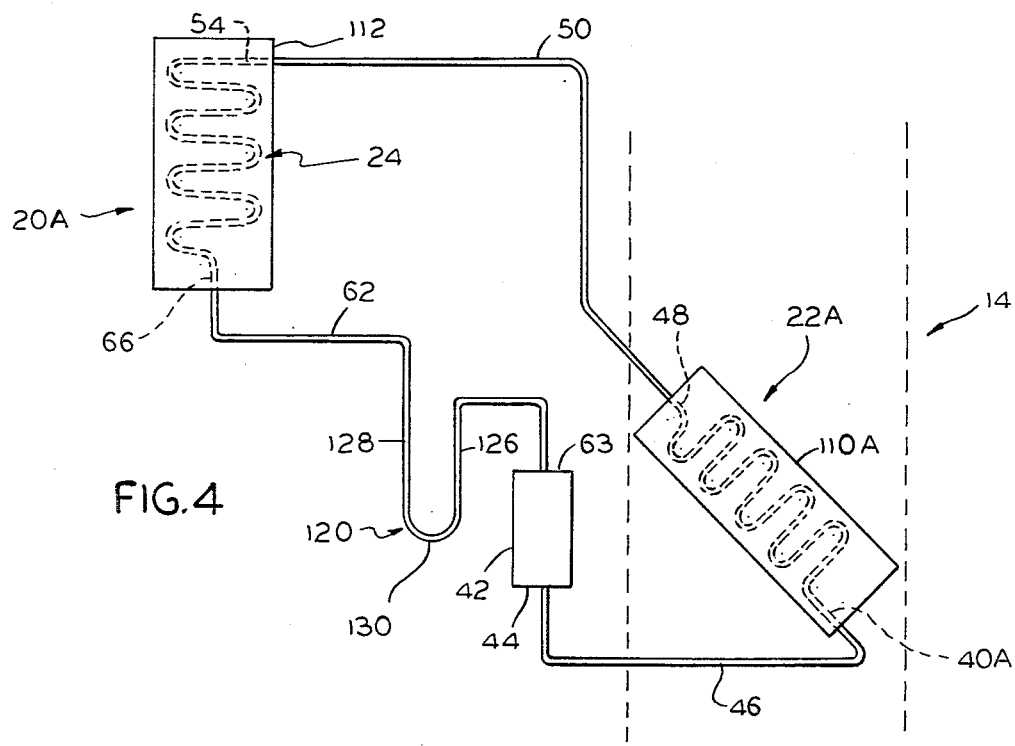

In the simplified system 20A of FIG. 4, the heat recycling arrangement involved is arranged only to supply heat to the incoming fresh air, and thus to coil 24. Thus, the control arrangement 80 is eliminated together with the conduiting connections to tank 28, with the other parts of the system remaining the same as described in connection with the showing of FIG. 2, as indicated by corresponding reference numerals, except that recovery coil 22A is of the same physical construction as coil 24, and thus has its intake end 40A connected to receiver 42 and its outflow end 48A connected to coil 24. Coil 22A is embodied in frame 110A.

Figure 5:
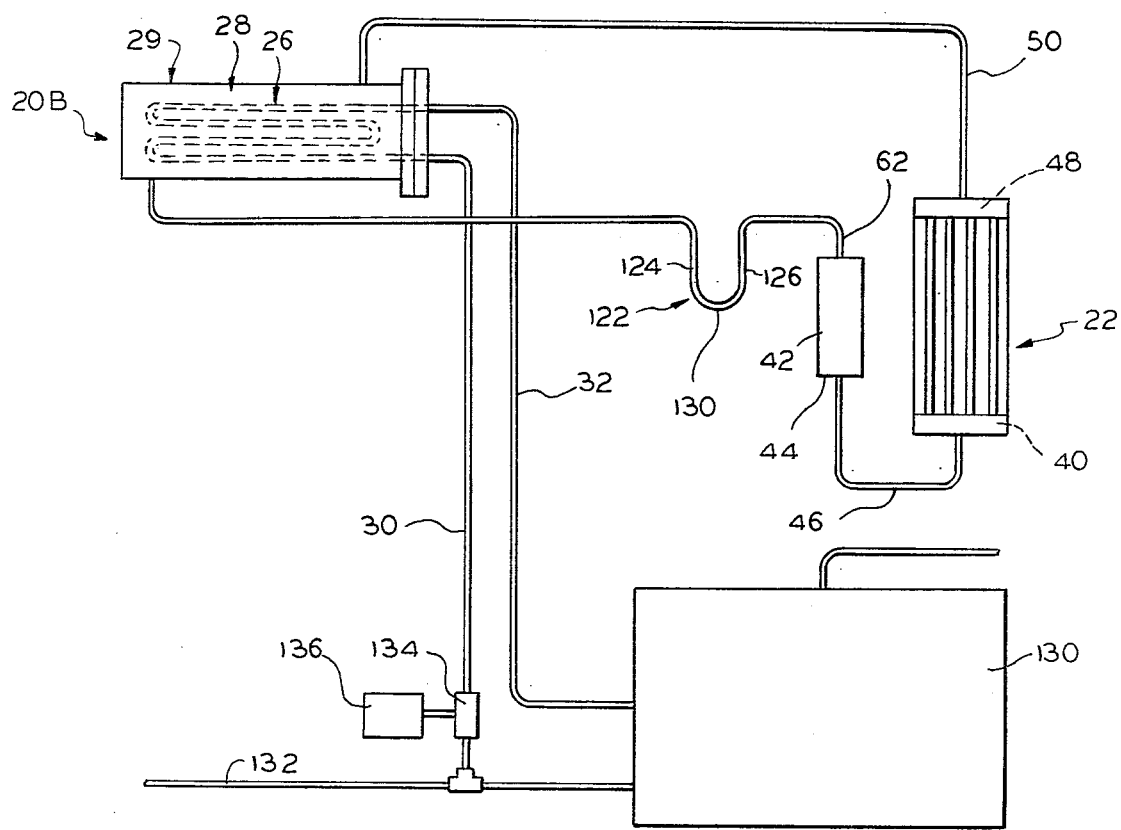

In the embodiment of FIG. 5, the heat recycling system 20B involved supplies covered heat only to the chamber 29, and thus to coil 26. Here again, the control arrangement 80 is therefore eliminated, as well as the connections with coil 24, with the remaining components being the same as shown in FIG. 2, as indicated by corresponding reference numerals to the extent applicable. In FIG. 5, the water storage tank 130 is illustrated where water supply to the tank 130 is through conduit 132 or alternately, when the system 20B is operating, through conduit 30 under the impetus of suitable pump 134 operated by motor 136, coil 26 and conduit 32.

It will be apparent that with regard to the water tempering arrangements of FIGS. 2 and 5, a heat exchange coil similar to coil 24 and connected directly into the refrigeration system may be mounted in chamber 29 in place of coil 26, with the water from tank 130 filling chamber 29 and flowing therethrough via conduits 30 and 32. However, the arrangement illustrated for chamber 29 is preferred because of the concentrated heat inflow effect on water flowing through coil 26.

It therefore will be apparent that the invention provides a heat exchange system for recycling stack heat to recover much of the waste heat leaving the stack and apply it in an efficient manner to heat incoming fresh air or temper water of a water storage tank. The refrigerant flow system involved is free of any mechanical pumping or compressor requirements, with the refrigerant flow being induced by the heat at the heat source in the stack.

The foregoing description and the drawings are given merely to explain and illustrate the invention, and the invention is not to be limited thereto, except insofar as the appended claims are so limited, since those skilled in the art who have the instant disclosure before them will be able to make modifications and variations therein without departing from the scope of the invention.

I claim:

1. In a building having a food cooking facility including a discharge flue communicating between the facility and the exterior of the building, blower means for drawing air bearing waste heat from the facility and impelling same through said flue and exteriorly of the building, with the building further including an air intake duct and blower means for drawing fresh air from exteriorly of the building and impelling it through said duct and into the building, said building also including a water storage tank containing water to be tempered, a heat recovery arrangement for alternately supplying heat from said flue to the fresh air passing through said duct or to said tank, said arrangement comprising:

a closed circuit heat generated refrigerant flow type refrigeration system mounted in the building and comprising:

a heat recovery coil mounted in said flue for providing a source of heat charged refrigerant, a first heat transfer coil mounted in said duct, a refrigerant receiver having upper and lower ends, conduiting connecting said coils and said receiver in a first series connected refrigerant flow circuit, a second heat transfer coil mounted remote from said tank in heat transfer relation to the water, means for exposing said second heat transfer coil to the heat charged refrigerant of said heat recovery coil including conduit means connecting said heat recovery coil and said receiver in a second series connected refrigerant flow circuit, said refrigerant conduiting and conduit means adjacent the respective heat transfer coils and said receiver being shaped to define a vertically disposed bight portion of upright U-configuration that is free of refrigerant flow obstructions for forming liquid refrigerant traps adjacent said heat discharge coils, and a refrigerant filling said coils, said conduiting, said conduit means, and said receiver, said receiver and said traps being horizontally aligned with the horizontal level of said recovery coil, said refrigerant conduiting and conduit means including thermostatically controlled valve means for alternately disconnecting said heat transfer coils from said heat recovery coil in accordance with a predetermined ambient air temperature exteriorly of said building.

2. In a building having a food cooking facility including a discharge flue communicating between the facility and the exterior of the building, blower means for drawing air bearing waste heat from the facility and impelling same through said flue and exteriorly of the building, with the building further including an air intake duct and blower means for drawing fresh air from exteriorly of the building and impelling it through said duct and into the building, said building also including a water storage tank containing water to be tempered, a heat recovery arrangement for alternately supplying heat from said flue to the fresh air passing through said duct or to said tank, said arrangement comprising:

a closed circuit heat generated refrigerant flow type refrigeration system mounted in the building and comprising:

a heat recovery coil mounted in said flue for providing a source of heat charged refrigerant, a first heat transfer coil mounted in said duct, a refrigerant receiver having upper and lower ends, conduiting connecting said coils and said receiver in a first series connected refrigerant flow circuit, a second heat transfer coil mounted remote from said tank in heat transfer relation to the water, means for exposing said second heat transfer coil to the heat charged refrigerant of said heat recovery coil including conduit means connecting said heat recovery coil and said receiver in a second series connected refrigerant flow circuit, said refrigerant conduiting and conduit means intermediate the respective heat transfer coils and said receiver defining liquid refrigerant return flow conduiting each shaped to define a vertically disposed bight portion of upright U-configuration that is free of liquid refrigerant flow obstructions for forming gravity induced liquid refrigerant traps, said bight portions of said traps being elevationally disposed to be below the respective heat transfer coils and adjacent the horizontal level of said receiver, and a refrigerant filling said coils, said conduiting, said conduit means, and said receiver, said receiver and said traps being elevationally disposed to be at a level that is horizontally adjacent the horizontal level of said recovery coil, said refrigerant conduiting and conduit means including thermostatically controlled valve means for alternately disconnecting said heat transfer coils from said heat recovery coil in accordance with a predetermined ambient air temperature exteriorly of said building.

3. In a building having a food cooking facility including a discharge flue communicating between the facility and the exterior of the building, blower means for drawing air bearing waste heat from the facility and impelling same through said flue and exteriorly of the building, with the building further including an air intake duct and blower means for drawing fresh air from exteriorly of the building and impelling it through said duct and into the building, said building also including a water storage tank containing water to be tempered, a heat recovery arrangement for alternately supplying heat from said flue to the fresh air passing through said duct or to said tank, said arrangement comprising:

a closed circuit heat generated refrigerant flow type refrigeration system mounted in the building and comprising:

a heat recovery coil mounted in said flue for providing a source of heat charged refrigerant, a first heat transfer coil mounted in said duct above the horizontal level of said heat recovery coil, a refrigerant receiver having upper and lower ends, refrigerant conduiting connecting said coils and said receiver in a first series connected refrigerant flow circuit, a second heat transfer coil mounted above the horizontal level of said heat recovery coil and remote from said tank in heat transfer relation to the water, means for exposing said second heat transfer coil to the heat charged refrigerant of said heat recovery coil including conduit means connecting said heat recovery coil and said receiver in a second series connected refrigerant flow circuit, and a refrigerant filling said coils, said conduiting, said conduit means, and said receiver, said receiver being horizontally aligned with the horizontal level of said recovery coil, said refrigerant conduiting and conduit means including thermostatically controlled valve means for alternately disconnecting said heat transfer coils from said heat recovery coil in accordance with a predetermined ambient air temperature exteriorly of said building.

4. The heat recovery arrangement set forth in claim 3 wherein:

said first and second series flow circuits adjacent and downstream of the respective heat transfer coils are each shaped to define a vertically disposed bight portion of upright U-configuration that is free of refrigerant flow obstructions for forming liquid refrigerant traps adjacent said heat discharge coils, said traps being horizontally aligned with the horizontal level of said recovery coil.

* * * * *